Apr. 17, 1923.

R. N. COATS

CAR BRAKE

Filed Aug. 10, 1922

1,451,942

Inventor
Roy N. Coats
By W.L. & C.L. Reynolds
Attorneys

Patented Apr. 17, 1923.

1,451,942

UNITED STATES PATENT OFFICE.

ROY N. COATS, OF RENTON, WASHINGTON, ASSIGNOR TO PACIFIC CAR AND FOUNDRY COMPANY, OF SEATTLE, WASHINGTON, A CORPORATION OF WASHINGTON.

CAR BRAKE.

Application filed August 10, 1922. Serial No. 580,840.

*To all whom it may concern:*

Be it known that I, ROY N. COATS, a citizen of the United States of America, and resident of the city of Renton, in the county of King and State of Washington, have invented certain new and useful Improvements in Car Brakes, of which the following is a specification.

My invention relates to a brake operating means for use upon railway cars.

One of the objects of my invention is to provide a ratchet means for operating a brake in which the ratchet dog is normally disengaged when not in active use, and in which the ratchet dog will automatically reengage when moved into the position of use.

A further object is to provide automatic means for releasing such ratchet dog while in position of use.

A further object is to provide means preventing such release of the ratchet dog while in position of use except as the holding dog is released.

Another object is to provide a ratchet dog which is gravity actuated to engage or to disengage the ratchet wheel, and controlled by manipulation of the operating handle.

A further object is the provision of a simple and convenient brake of the character described and one which is simple in operation.

A still further object is the provision of a conveniently assembled and attached bracket for use in connection with such a brake operating means.

My invention comprises those novel parts and combinations thereof which are shown in the accompanying drawings, described in the specification, and particularly defined by the claims terminating the same.

In the accompanying drawings I have shown my invention in the form which is now preferred by me.

Figures 1, 2:
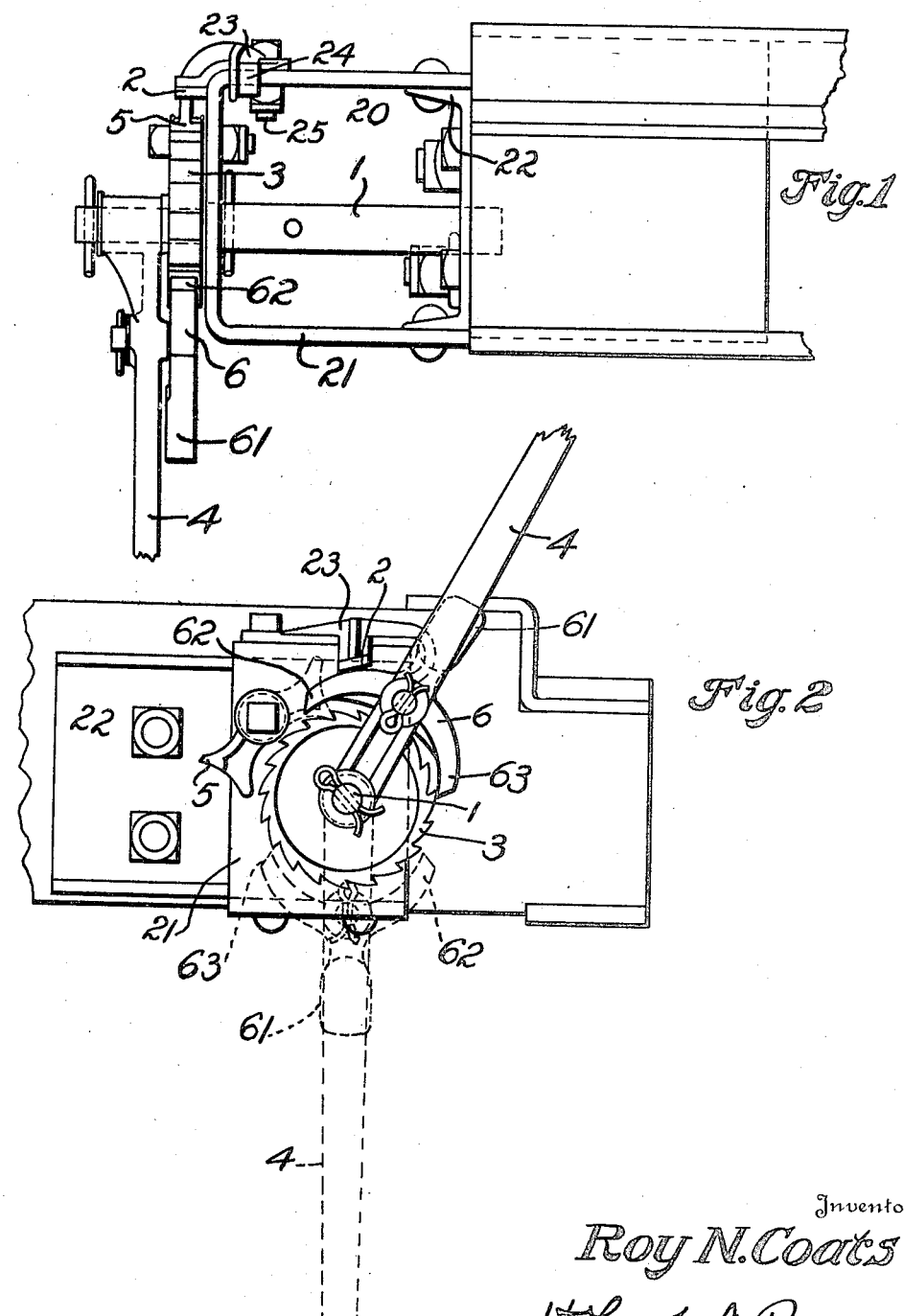
Figure 1 is an end elevation of the brake operating mechanism shown in normal position, when not in active use.
Figure 2 is a side elevation of the same mechanism shown in releasing position, while in active use.

A brake staff 1 of any suitable construction, is mounted upon the car, or as shown herein, upon a bracket 20 which is adapted to be secured upon the car, and by means of which the brake operating mechanism as a unit may be placed upon or removed from the car. This bracket may be of any suitable construction, the preferred construction, however, being described hereinafter.

Upon the brake staff 1 is secured a ratchet wheel 3. Also pivotally secured upon the brake staff 1 to rotate relative thereto is a handle 4. Ordinarily this handle, when not in active use, will hang by gravity in the position shown by dotted lines in Figure 2. A holding dog 5 is pivoted upon the bracket 20, preferably at one side of a vertical plane passing through the axis of the brake staff 1.

A ratchet dog is provided for the ratchet wheel 3. Preferably this is pivoted upon the handle 4, and in the embodiment shown in the accompanying drawings this is shown as a lever 6 pivoted between its ends. One end 63 forms the ratchet dog while the opposite end 62 functions as a dog-releasing arm in cooperation with the cam stop 2. As shown it has a curved upper surface not concentric with the ratchet wheel 3 and extendible under the cam 2. The lever 6 is weighted, the weight 61 being so positioned that when the handle 4 is in its normal inoperative position the weight 61 will hang down to disengage the ratchet dog 63 from the ratchet wheel 3. It will be seen then that upon movement of the handle to the right from the position shown in Figure 2, the weight 61 will cause the ratchet dog 63 to engage the teeth of the ratchet wheel 3. Movement to the left thereafter will rotate the brake staff 1. In this manner the weight 61 effects both engagement and disengagement of the ratchet dog 63 with the ratchet wheel 3, by proper manipulation of the handle 4.

I provide means whereby the dog 63 may be thrown out of operative position while the handle 4 remains in operative position. This means I have shown as a stop or cam 2 which is inclined and which projects into the path of the arm 62 of lever 6. Upon engagement of the cam 2 and the arm 62 the lever 6 is rocked on its pivot and the dog 63 is disengaged as is shown in Figure 2. Preferably this cam surface 2 is located immediately above the normal inoperative position of the handle 4, for by such location it is possible to cause engagement of the dog 63 and subsequently its disengagement by less than 180° movement of the handle 4; that is, by slight movement from the normal engaging position.

The normal operative position of the holding dog 5 is shown in dotted lines in Figure 2. It will be noted that when the holding dog 5 is in this position the arm 62 when moved in the direction to release the dog 63 will contact with the holding dog 5 prior to its release by the cam 2. In fact, the cam 2 and holding dog 5 may be so positioned relatively that no release action of the ratchet dog 62 will occur prior to engagement of the arm 62 with the holding dog 5. Inasmuch as the dog 5 prevents automatic release of the ratchet dog 63 by means of the cam 2, it follows that such release cannot occur except when the holding dog 5 is released. Such release of the ratchet dog 63 would only be desired when it is the intention to release the brakes, consequently this action of the holding dog 5 prevents accidental release of the brakes during the operation of setting them.

The cam 2 is shown as part of a cam plate 23 which is secured to and forms an extension fitted upon the bracket 20. The bracket 20 is conveniently formed of a strap 21 bent in U-shape, and containing the outer bearing of the brake staff 1, and a channel bar 22 to which the ends of the strap 21 are secured, and which channel bar forms the inner bearing for the brake staff 1 and the means by which the bracket is secured to the car. The cam plate 23 has a hook 24 at one end, which engages beneath an edge of the strap 21, and its opposite end is secured by a single bolt 25 passing therethrough and through the strap 21. This makes for easy replacement of the single cam plate, instead of an entire bracket, in case of damage thereto.

What I claim as my invention is:

1. In a car brake operating means, in combination, a brake staff, a ratchet wheel secured thereon, a holding dog, an operating handle pivoted concentrically with said ratchet wheel and when not in use hanging by gravity in inoperative position, a weighted ratchet dog pivotally secured upon said handle, and adapted to be disengaged from the ratchet wheel by gravity when the handle hangs in inoperative position, and to be automatically engaged with the ratchet wheel when the handle is raised, and means for disengaging the ratchet dog from the ratchet wheel operable by further raising the handle.

2. In a car brake operating means, in combination, a horizontal brake staff, a ratchet wheel secured thereon, a holding dog positioned at one side thereof, an operating handle pivoted concentrically with the ratchet wheel and when not in use hanging by gravity in vertical position, a weighted ratchet dog pivotally secured upon said handle, and adapted to be automatically engaged by gravity with the ratchet wheel when the handle is raised, and to be disengaged therefrom by gravity when the handle hangs in inoperative position, and a cam fixed above said ratchet wheel and engageable by the ratchet dog to release the latter upon raising the handle to an extreme upper position.

3. In a car brake operating means, in combination, a brake staff, a ratchet wheel secured thereon, a releasable holding dog, an operating handle pivoted concentrically with the ratchet wheel, a ratchet dog engageable with said ratchet wheel, and a cam engageable by said ratchet dog to release the latter, said holding dog and cam being so positioned relatively that movement of the handle in a direction to release the ratchet dog is interrupted, prior to its release, by the holding dog when the latter is in operative position.

4. In a car brake operating means, in combination, a brake staff, a ratchet wheel secured thereon, a releasable holding dog, an operating handle pivoted concentrically with the ratchet wheel, a lever pivoted between its ends upon said handle, one end thereof forming a ratchet dog, and a cam engageable by the opposite end of said lever to release the ratchet dog, said cam and holding dog being so positioned relatively that movement of the handle in a direction to release the ratchet dog is interrupted by contact of the cam-engaging end of the lever and the holding dog prior to engagement of such end and the cam, and while the holding dog remains in operative position.

5. In a car brake operating means, in combination, a brake staff, a ratchet wheel secured thereon, a holding dog, an operating handle pivoted concentrically with the ratchet wheel, and when not in use hanging down by gravity, a lever pivoted between its ends, one end forming a ratchet dog, and a weight extending from the pivot center of said lever approximately at right angles to its general direction and adapted to release said ratchet dog by gravity when the handle is in position of disuse, and to cause its engagement with the ratchet wheel when the handle is moved towards operative position.

6. In a brake operating means, in combination, a brake staff, a channel bar having a bearing for one end thereof, a U-shaped strap secured to the flanges of said channel bar, and having a complemental bearing for the brake staff, a ratchet wheel secured upon said brake staff, a holding dog therefor, a handle pivotally secured upon the brake staff, a ratchet dog carried thereby and engageable with the ratchet wheel, and means for automatically releasing the ratchet dog.

7. In a brake operating means, in combination, a brake staff bracket comprising a channel bar and a strap of U-shape secured to the flanges thereof, a brake staff having a bearing in each of said channel bar and strap, and extending outwardly of the latter, a ratchet wheel secured upon such outward extension of the staff, a handle pivotally secured upon such outward extension outwardly of the ratchet wheel, a ratchet dog carried thereby and engageable with the ratchet wheel, a holding dog, a cam plate having a hook engageable under an edge of said strap and adapted to be secured thereto by a bolt, and having a cam surface extending beyond the end of said strap into position to engage said ratchet dog to release it.

8. In a car brake operating mechanism, a ratchet wheel, a holding dog, an operating arm, a ratchet dog carried by said arm, a tappet cam positioned to release said dog at the extreme backward movement of said arm, said holding dog and cam being positioned to prevent engagement of the ratchet dog with the cam when the holding dog is in holding position.

9. In a car brake operating mechanism, a ratchet wheel, a holding dog, an operating arm, a ratchet dog carried by said arm, a tappet cam positioned to release said dog at the extreme backward movement of said arm, said holding dog and cam being positioned to prevent engagement of the ratchet dog with the cam when the holding dog is in holding position, and automatically operating means for holding the ratchet dog in release position when the operating arm is in depending position and to hold it in engaging position when the operating arm is thrown upward.

Signed at Renton, King County, Washington, this 19th day of July 1922.

ROY N. COATS.